(12) United States Patent
Barat et al.

(10) Patent No.: US 11,535,080 B2
(45) Date of Patent: Dec. 27, 2022

(54) BLOWER CONTROL MODULE AND CORRESPONDING HEATING AND/OR VENTILATION AND/OR AIR CONDITIONING DEVICE

(71) Applicant: Valeo Systemes Thermiques, Le Mesnil Saint Denis (FR)

(72) Inventors: Didier Barat, Le Mesnil Saint Denis (FR); Arnaud Roy, Le Mesnil Saint Denis (FR); Biagio Provinzano, Le Mesnil Saint Denis (FR); Stéphane De Souza, Le Mesnil Saint Denis (FR); Paul Le Sueur, Le Mesnil Saint Denis (FR); Iliass Laaiouni, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 207 days.

(21) Appl. No.: 16/967,971

(22) PCT Filed: Feb. 7, 2019

(86) PCT No.: PCT/FR2019/050268
§ 371 (c)(1),
(2) Date: Aug. 6, 2020

(87) PCT Pub. No.: WO2019/155164
PCT Pub. Date: Aug. 15, 2019

(65) Prior Publication Data
US 2021/0031587 A1 Feb. 4, 2021

(30) Foreign Application Priority Data
Feb. 9, 2018 (FR) ...................... 1851092

(51) Int. Cl.
*B60H 1/00* (2006.01)
*F04D 27/00* (2006.01)

(52) U.S. Cl.
CPC ....... *B60H 1/00021* (2013.01); *F04D 27/004* (2013.01); *B60H 2001/00614* (2013.01)

(58) Field of Classification Search
CPC .... B60H 2001/00614; B60H 2001/003; B60H 1/00021; F04D 29/5813; H02K 11/33; H02K 5/18; H02K 5/22
See application file for complete search history.

(56) References Cited

U.S. PATENT DOCUMENTS 6,291,912 B1 * 9/2001 Nadir .................. H02K 11/33
310/68 R
7,715,196 B2 * 5/2010 Chen .................. H01L 23/34
165/185

FOREIGN PATENT DOCUMENTS

DE 102010046672 A1 3/2012
FR 2742816 A1 6/1997
(Continued)

OTHER PUBLICATIONS

International Search Report and Written Opinion corresponding to International Application No. PCT/FR2019/050268, dated Jun. 17, 2019 (11 pages).

*Primary Examiner* — Lionel Nouketcha
(74) *Attorney, Agent, or Firm* — Osha Bergman Watanabe & Burton LLP

(57) ABSTRACT

The invention concerns a control module (15) of a blower for a heating and/or ventilation and/or air conditioning device, in particular for a motor vehicle, the blower being configured to generate an airflow, and the control module (15) being configured to control the blower and comprises a heat sink (157), a heat dissipation base (158) and at least one active power electronic component (153) mounted on the (Continued)

Figure 1:
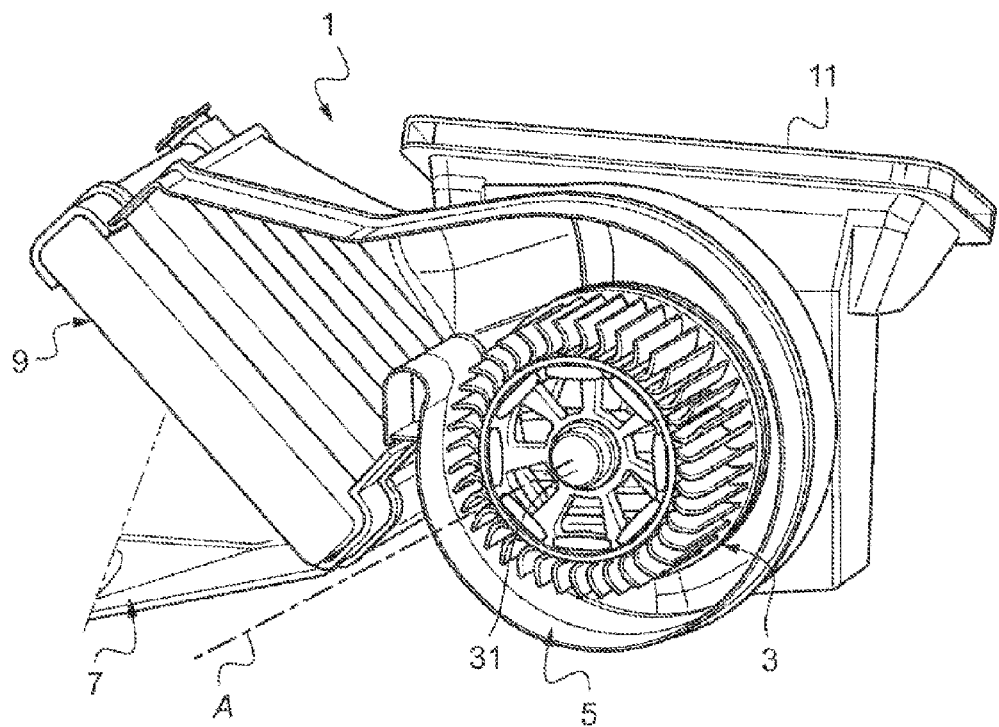

heat dissipation base (158). According to the invention, the heat sink (157) comprises a housing (156) for receiving at least a part of the heat dissipation base (158). The heat sink base (158) is mounted by press-fitting into said housing (156). The invention also relates to a corresponding heating and/or ventilation and/or air conditioning device.

10 Claims, 2 Drawing Sheets

(56) References Cited

FOREIGN PATENT DOCUMENTS

| FR | 2766301 A1 | 1/1999 |
| FR | 2868018 A1 | 9/2005 |
| FR | 3044604 A1 | 6/2017 |
| FR | 3046958 A1 | 7/2017 |

\* cited by examiner

BLOWER CONTROL MODULE AND CORRESPONDING HEATING AND/OR VENTILATION AND/OR AIR CONDITIONING DEVICE

The invention relates to the field of ventilation, heating and/or air conditioning installations, in particular for a motor vehicle. The invention relates in particular to a module for controlling a blower for such an installation.

Heating and/or ventilation and/or air conditioning (or HVAC) installations for a motor vehicle make it possible to distribute air in a vehicle interior and generally include an air duct in which are arranged various means for heat treatment of the air. The means for heat treatment of the air are in particular heat exchangers, for heating and/or cooling, for example an air heating radiator and an evaporator intended to cool the air.

The air flow circulating in the heating and/or ventilation and/or air conditioning installation is generated by a motor-fan unit, also called a blower or air blower, which is mounted at the level of a blower housing of the installation, which channels the air flow. The air flow is directed, via the blower, to one or more outlets of the installation opening into the passenger compartment, after having been heat treated.

The blower comprises in particular a fan wheel or turbine housed in the blower housing in order to generate an air flow therein, and an electric drive motor capable of rotating the fan wheel. Conventionally, the blower, and more precisely the drive motor, is controlled by a control module. The control module makes it possible in particular to vary the speed of the motor as required and for this purpose comprises components, more particularly electrical and electronic components, including electronic power components, in particular active electronic power components. Mention may be made, for example, of semiconductor components such as diodes, transistors, in particular insulated-gate field-effect transistors known by the acronym MOSFET for "Metal-Oxide-Semiconductor Field-Effect Transistor". As opposed to passive components which cannot introduce energy into the circuit to which they belong and which cannot be changed, active components can change state and conduct or block energy.

One problem is the cooling of the control module. For example, in operation, active power electronic components such as MOSFETs can reach a temperature of the order of 175° C. If the temperature of the control module exceeds a predefined maximum temperature, this risks damaging certain elements of the control module such as the power electronic components or even a printed circuit board electrically connected thereto.

To dissipate the heat generated by the components of the control module, it is known practice for a heat sink or heat dissipation radiator to be associated therewith.

To do this, the heat sink is generally screwed onto the printed circuit board on which the electronic power component(s) of the control module is or are mounted. The heat sink has fins which are arranged to be exposed to the air flow generated in the blower housing. For this purpose, the heat sink is generally placed at the outlet of the blower housing. A heat dissipation interface, also called heat dissipation sole, can be arranged on the heat sink on the opposite side from the fins, between the heat sink and the printed circuit board.

However, such a screw fixing presents a major risk of unscrewing during operation, causing the heat sink to separate from the component(s) of the control module.

As a variant, it is known to use one or more clips or tabs, arranged so as to press on the electronic component(s) of the control module so that it/they is/are in contact with the heat sink. The drawback of such clips is that the force exerted on the electronic component(s) of the control module is not even and can damage these components, in particular the plastic casing surrounding each component.

The object of the invention is to ensure efficient cooling of the components of the control module while improving the assembly between the control module and the heat sink and making this assembly more reliable.

To that end, the invention relates to a control module for a blower for a heating and/or ventilation and/or air conditioning installation, in particular for a motor vehicle, the blower being configured to generate an air flow, and the control module being configured to control the blower and includes a heat sink, a heat dissipation sole and at least one active power electronic component mounted on the heat dissipation sole.

According to the invention, the heat sink comprises a slot for receiving at least part of the heat dissipation sole, and the heat dissipation sole is mounted by force fitting in said slot.

Thus, the heat sink presses on the heat dissipation sole force-fitted into the slot provided for this purpose at the level of the heat sink. The heat sink is therefore shaped to receive and cooperate with the heat dissipation sole in order to assemble and hold the active component in thermal contact on the heat sink.

Said module may also comprise one or more of the following features, considered separately or in combination:
- the heat dissipation sole has at least two opposite faces arranged in contact with the heat sink, when the heat dissipation sole is received in said slot;
- the heat dissipation sole is engaged in said slot by having a shape matching that of the heat sink;
- the heat sink comprises at least one means for elastic retention of the heat dissipation sole in the slot;
- the heat sink comprises at least one flexible wall delimiting said slot;
- the heat sink comprises a base extending opposite said at least one flexible wall;
- said slot is delimited between the base and said at least one flexible wall;
- the flexible wall is configured to move away from the base upon insertion of the heat dissipation sole into said slot, and to exert an elastic pressure on the heat dissipation sole received in said slot;
- the heat sink has cooling fins extending from the base and configured to be arranged in the air flow generated by the blower;
- the heat dissipation sole is configured to be inserted into said slot according to a translational movement;
- the heat sink is metallic;
- the heat dissipation sole is metallic;
- the control module comprises a printed circuit board having an electrical supply circuit for the blower to which said at least one electronic power component is connected by at least one electrical connection member;
- the heat sink comprises at least one fastening element at said slot configured to cooperate with the heat dissipation sole.

The invention also relates to a heating and/or ventilation and/or air conditioning installation comprising a blower configured to generate an air flow, and at least one control module as defined above.

Figure 2:
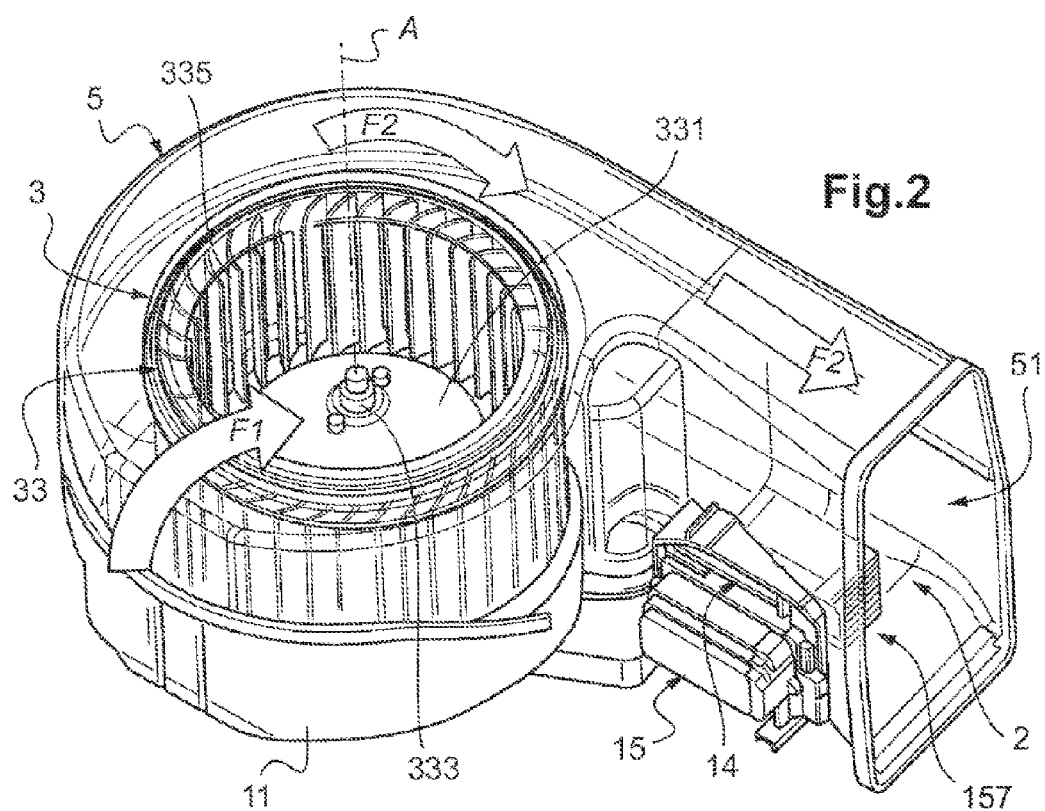
Figure 3:
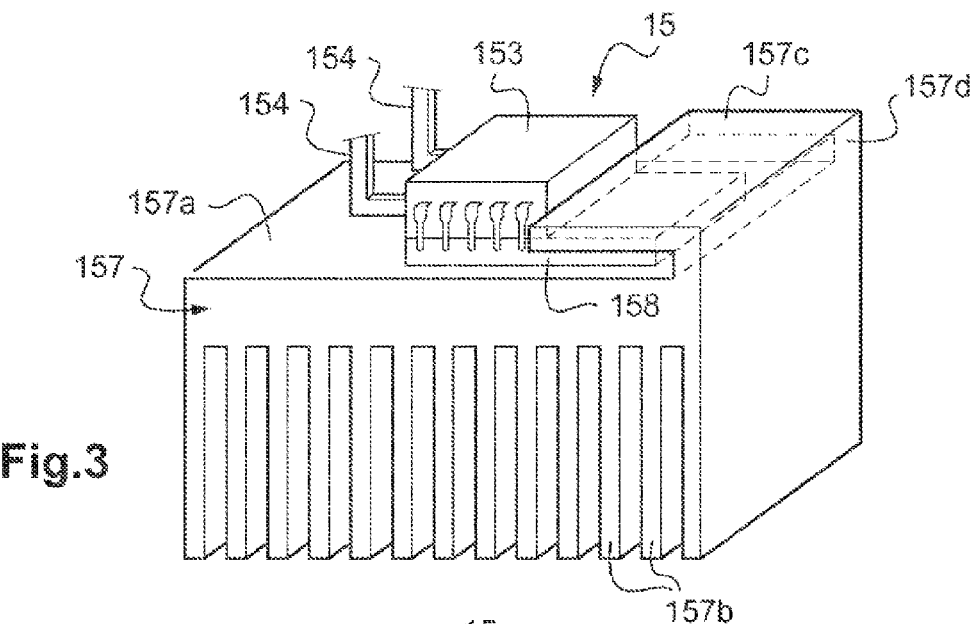
Figure 4:
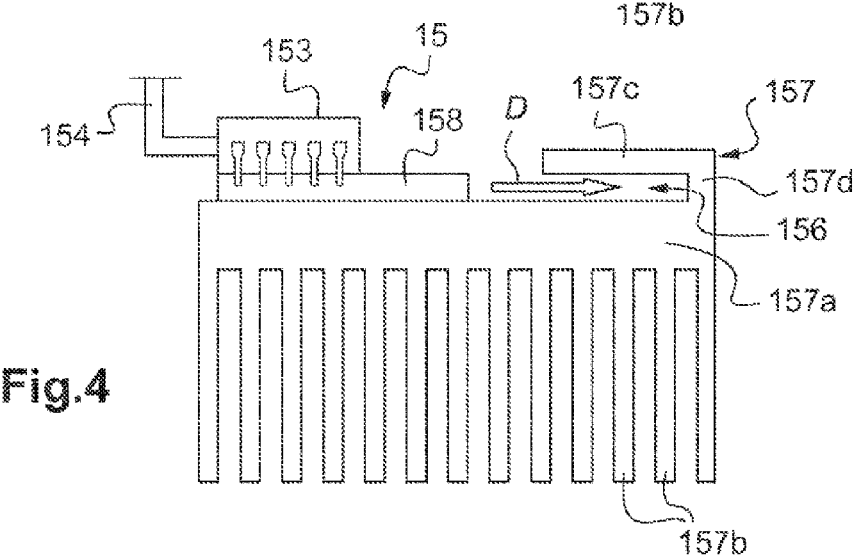
Figure 5:
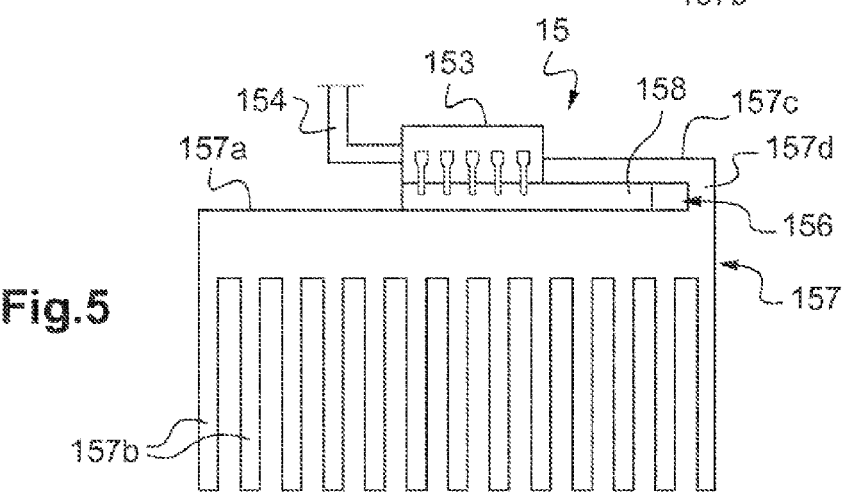

Further features and advantages of the invention will become more clearly apparent from reading the following description, given by way of non-limiting illustrative example, and from the attached drawings, in which:

FIG. 1 is a schematic view partially in section showing in part a heating and/or ventilation and/or air conditioning installation, in particular for a motor vehicle, FIG. 2 is a view of a blower housing of the installation of FIG. 1, accommodating an air blower, FIG. 3 is a schematic perspective representation showing part of a control module for the air blower, FIG. 4 schematically shows an active electronic power component before insertion into a slot of a heat sink of the control module of FIG. 3, and FIG. 5 schematically shows the active electronic power component after insertion into the slot of the heat sink of the control module.

In these figures, identical elements have been referenced with the same references.

The following embodiments are examples. Although the description refers to one or more embodiments, this does not necessarily mean that each reference relates to the same embodiment, or that the features apply to just one embodiment. Individual features of different embodiments can also be combined or interchanged in order to create other embodiments.

In the description, certain elements, such as for example the first element or second element, may be indexed. In this case, the index is simply used to differentiate and denote elements that are similar but not identical. This indexing does not imply a priority of one element with respect to another and such denominations may easily be interchanged without departing from the scope of the present description. This indexing also does not imply an order in time.

FIG. 1 schematically shows part of a heating and/or ventilation and/or air conditioning installation 1, hereinafter referred to as installation 1, in particular for a motor vehicle.

The installation 1 defines at least one channel 2 inside which at least one air flow is able to circulate.

Such an installation 1 comprises a motor-fan unit also called a blower or air blower 3 (see FIGS. 1 and 2), capable of generating an air flow.

The installation 1 comprises a blower housing 5, in which the blower 3 is intended to be mounted, and which channels the air flow generated by the blower 3.

The blower housing 5 may have a substantially spiral shape. The blower housing 5 then has a contour starting with a zone called "blower housing nose" and which evolves to an exit 51.

In operation, the blower 3 makes it possible to direct the air flow towards a duct 7 of the installation 1, which distributes the air flow to outlet openings which open into the passenger compartment of the vehicle. To that end, the outlet 51 of the blower housing 5 is connected to the duct 7.

In the example described, the blower housing 5 and the duct 7 delimit the circulation channel 2 for the air flow generated by the blower 3.

Furthermore, before opening into the passenger compartment, the air flow can undergo at least one heat treatment, for example it can be heated or cooled. To this end, the installation 1 further comprises one or more heat exchangers 9 arranged in the duct 7 and intended to be traversed by the air flow. These heat exchangers 9 known to those skilled in the art of heating and/or ventilation and/or air conditioning installations are not described in more detail below.

The blower 3 comprises a motor 31 and a wheel 33 also called a fan wheel or a blower wheel, intended to be driven by the motor 31, so as to ensure the setting in motion of the air flow. The motor 31 is configured to drive the fan wheel 33 in rotation about an axis of rotation A.

The fan wheel 33 is accommodated inside the blower housing 5. On one of its sides, the blower housing 5 has an opening closed by a cover 11 forming a support for the motor 31 to drive the fan wheel 33. The motor 31 and the fan wheel 33 are coaxial.

In the example illustrated in FIG. 2, the fan wheel 33 has a generally substantially cylindrical shape, with an open face. The open face is on the side opposite to the cover 11 forming a motor support. This open face is, when the blower 3 is mounted in the installation 1, in aeraulic communication with one or more air inlets 11 (see FIG. 1), for example for outside air coming from outside the passenger compartment and/or recirculated air from the passenger compartment, of the installation 1.

The fan wheel 33 is configured to draw in, through this open face, an air flow as shown diagrammatically by the arrow F1 in FIG. 2, then to evacuate this air flow from the side, that is to say in this case radially relative to the axis of rotation A, as shown schematically by arrows F2, when it is driven in rotation. The air drawn in and circulated by the fan wheel 33 is removed from the blower housing 5 through the outlet 51.

According to the embodiment shown in FIG. 2, the fan wheel 33 has a portion 331 forming a bottom, for example substantially bowl-shaped, which is arranged opposite the open face of the fan wheel 33. The fan wheel 33 further comprises a hub 333, for example substantially in the center of the bowl-shaped portion 331, to receive a free end of a transmission shaft of the motor 31. The fan wheel 33 may include a plurality of blades 335 or vanes. In this example, the blades 335 extend axially from the periphery of the bowl-shaped portion 331.

Such a blower 3 is controlled by a control module 15 shown very schematically in FIG. 2. More precisely, the control module 15 makes it possible to control the motor 31, for example the speed of rotation of the motor 31 (not visible in FIG. 2).

This control module 15 is arranged in the installation 1, for example at the level of the outlet 51 of the blower housing 5, as illustrated in FIG. 2. A cavity 14 may be provided on a wall of the outlet 51 of the blower housing 5, to receive the control module 15. This location is by way of illustration and is not limiting. The control module 15 can be arranged elsewhere in the installation 1, for example on a wall of the duct 7 (also referring to FIG. 1). The location of the control module 15 can be chosen to limit the length of conductor cables between the control module 15 and the blower 3.

The control module 15 generally comprises a printed circuit board (not shown in the figures). The printed circuit board has a circuit for providing electrical power to the blower. The printed circuit board is in the form of a plate.

The control module 15 comprises one or more electronic components, including at least one electronic power component electrically connected to the electrical supply circuit. In particular, the control module 15 comprises at least one active electronic power component 153, designated hereinafter by "active component", shown schematically in FIGS. 3 to 5.

As opposed to a so-called passive component, such as a resistor, which does not allow energy to be introduced into the circuit to which it belongs or to increase the power of a signal and which cannot be modified, an active component 153 is an electronic component that makes it possible to increase the strength of a signal, that can change state and that can conduct or block energy. We can also speak of a controllable component. Mention may primarily be made, for example, of semiconductor components such as diodes, transistors, in particular insulated-gate field-effect transistors known by the acronym MOSFET for "Metal-Oxide-Semiconductor Field-Effect Transistor".

In a known manner, the active component 153 comprises a chip which is encapsulated in a plastic casing.

According to the embodiment described, the active component 153 can be connected by at least one electrical connection member, such as electrical connection tabs or pins 154 (FIG. 3), to the printed circuit board, in particular to the circuit. This configuration with the active component 153 remote from the printed circuit board makes it possible to limit the risks of damage to the printed circuit board due to an excessively high temperature of the active component 153. Indeed, the printed circuit board is more limited in temperature than the active component 153. The printed circuit board can reach a maximum temperature of the order of 150° C. while the active component 153 can reach a maximum temperature above 150° C., in particular of the order of 175° C.

According to the embodiment described, the control module 15 further comprises a heat dissipation sole 158. Such a sole 158 is for example metallic. It may have the general shape of a plate. The active component 153 is mounted on the heat dissipation sole 158.

The control module 15 further comprises at least one heat sink 157 or heat dissipation radiator (see FIGS. 3 to 5). The heat sink 157 is configured to dissipate at least part of the heat generated in particular by the electronic power component(s) of the control module 15, such as the active component 153.

The heat sink 157 is made of a thermally conductive material. It is for example a metal part.

The heat sink 157 is connected to ground.

According to the illustrated embodiment, the heat sink 157 comprises a base 157a.

The heat sink 157 for example also includes cooling fins 157b extending from the base 157a. The fins 157b are intended to be arranged in the air flow generated by the blower 3 (not visible in FIGS. 3 to 5), in the mounted state of the control module 15 in the installation 1 and during operation of the blower 3. In other words, the control module 15 is intended to be arranged in the installation so that the fins 157b of the heat sink 157 extend at least in part into the circulation channel 2 (not visible in FIGS. 3 to 5). To that end, the control module 15 and in particular the heat sink 157 can be mounted at a wall of the duct 7 or of the outlet 51 of the blower housing 5 (also with reference to FIGS. 1 and 2).

The heat sink 157 also has a wall 157c arranged opposite the base 157a, on the side opposite the fins 157b.

It is in particular a flexible wall 157c (the flexibility of the wall may be due to its thickness and/or to the material used). According to the particular case described, the term "flexible" is understood to mean the fact that the wall 157c is capable of deforming under the action of an external force tending to move it away from the base 157a. In the free or neutral state, without exerted pressure, the flexible wall 157c can extend parallel or almost parallel to the base 157a.

In addition, it may be a planar or substantially planar wall 157c. Finally, it is connected to the base 157a by one or more connecting parts 157d.

As best seen in FIGS. 4 and 5, the heat sink 157 has a gap or slot 156. This slot 156 is delimited between the base 157a of the heat sink 157 and the flexible wall 157c. In the example illustrated, only a connecting part 157d connects the flexible wall 157c to the base 157a, thus closing the slot 156 at one end. As a variant, other connecting parts 157d can be provided, so that the slot 156 is also closed on the side(s).

In addition, so as to be able to dissipate the heat generated by the active component 153, the heat sink 157 is arranged in thermal contact with the active component 153. The term "thermal contact" means that two elements are arranged in direct contact or are joined indirectly with interposition of one or more thermal conductors, so as to allow in either case the conduction of the heat generated between these elements. According to the particular embodiment described, the heat dissipation sole 158 on which the active component 153 is mounted is intended to be fixed to the heat sink 157. In this way, the active component 153 is arranged in thermal contact with the heat sink 157 through the heat dissipation sole 158, which allows the conduction of the heat generated by the active component 153 towards the heat sink 157.

The heat dissipation sole 158 is separate from the heat sink 157. So this is another part.

In order to allow the assembly of the heat dissipation sole 158 on the heat sink 157, the slot 156 is configured to at least partly receive this heat dissipation sole 158. Assembly is done by force-fitting the heat dissipation sole 158 into the slot 156. Another term for this is "press-fitting".

To do this, the heat dissipation sole 158 is configured to be inserted into the slot 156, for example in a translational movement. The translational movement takes place in an insertion direction D (FIG. 4). The insertion direction D may be parallel to the general plane defined by the base 157a of the heat sink 157. In the example of FIG. 4, the insertion direction D is horizontal with reference to the arrangement of the elements in this figure. This representation is not limiting, the insertion direction D can be adapted according to the assembly configurations of the control module 15.

The heat sink 157 may include a guide element for the heat dissipation sole 158 when it is inserted into the slot 156. This guiding function can be provided by the base 157a and/or the flexible wall 157c.

Upon insertion of the heat dissipation sole 158 into the slot 156, the flexible wall 157c is configured to move away from the base 157a. The flexible wall 157c therefore deforms towards the outside of the slot 156. This increases the passage cross section for the heat dissipation sole 158 during its insertion into the slot 156.

One or more end-of-travel stops for the heat dissipation sole 158 can be provided in the slot 156. These stops may be formed on or by the connecting part(s) 157d. As a variant or in addition, the stops can be formed on or by the free end of the flexible wall 157c.

Further, the slot 156 is such that the heat sink 157 at least partially surrounds the heat dissipation sole 158 when the latter is mounted in the slot 156. In the example illustrated in FIGS. 3 and 5, the heat sink 157 comes both above and below the heat dissipation sole 158 with reference to the particular arrangement of the elements in these figures.

In other words, when it is received in the slot 156, the heat dissipation sole 158 has at least two opposite faces which are arranged in contact with the heat sink 157.

In the described example in which the slot 156 is delimited by the base 157a and the flexible wall 157c of the heat sink 157, in the state mounted in the slot 156, the heat dissipation sole 158 has a first face arranged in contact with the base 157a while a second opposite face is arranged in contact with the flexible wall 157c. The heat dissipation sole 158 is in surface contact with both the flexible wall 157c and the base 157a of the heat sink 157. This ensures heat dissipation at least by these two sides of the heat dissipation sole 158.

The heat dissipation sole 158 is engaged, or clamped, in the slot 156 by having a shape matching that of the heat sink 157. In other words, the heat sink 157 conforms to the shape of the heat dissipation sole 158 when the latter is inserted into the slot 156. It is the walls of the heat sink 157 which delimit the slot 156 which conform to the shape of the heat dissipation sole 158. Clearly, in the example described, the base 157a, the flexible wall 157c and the connecting part(s) 157d define a slot 156 of a shape complementary to the shape of the heat dissipation sole 158.

In addition, when the heat dissipation sole 158 is received in the slot 156, the heat sink 157 is able to exert an elastic pressure on this sole 158. The heat sink 157 comprises for this purpose at least one elastic retaining means of the heat dissipation sole 158 in the slot 156. It may be a snap-fitting means.

According to the described embodiment, it is the flexible wall 157c which exerts such an elastic pressure and therefore forms the elastic retaining means. The flexible wall 157c firmly presses on the heat dissipation sole 158. The heat dissipation sole 158 is thus retained in the slot 156.

In the described example, the pressure is exerted on the heat dissipation sole 158 in a direction normal to the general plane defined by the heat dissipation sole 158.

The heat dissipation sole 158 has a free surface, which is devoid of the active component 153, forming a bearing surface against which the flexible wall 157c, for example, is positioned and supported. The flexible wall 157c has at least one surface extending parallel to the heat dissipation sole 158, in particular to this free bearing surface, when the heat dissipation sole 158 is in the mounted state in the slot 156. In addition, the flexible wall 157c extends over all or almost all of the free bearing surface of the heat dissipation sole 158.

In addition to the elastic pressure exerted by the flexible wall 157c on the heat dissipation sole 158, it is conceivable that the heat sink 157 comprises at least one fixing element or member at the level of the slot 156, configured to cooperate with the heat dissipation sole 158, so as to also participate in keeping this sole 158 in the slot 15 (for example, complementary shapes can be arranged capable of cooperating with each other, the deformation of which would only be possible in the direction of mounting of the sole in the slot).

Furthermore, according to the embodiment illustrated in FIGS. 3 to 5, the printed circuit board (not shown) is not arranged in the slot 156 formed by the heat sink 157. It is therefore remote from this slot 156. With this configuration, the dissipation of heat generated by the active component 153 through the heat sink 157 intended to be cooled by the air flow is improved.

Thus, the heat dissipation sole 158 bearing a heat-generating power electronic component, such as the active component 153, is force-fitted into the slot 156 defined by the heat sink 157, to form the control module 15. Assembly is simple, not requiring welding or gluing for example, which makes it possible for the active component 153 to be positioned and kept in thermal contact with the heat sink 157. This heat sink 157 is also intended to be cooled by the air flow generated by the blower 3 when the control module 15 is mounted on the installation 1.

The flexible wall 157c, as well as the connecting part 157d and the base 157a which together define the slot 156, follow the shape of the heat dissipation sole 158 when the latter is inserted into the slot 156. The flexible wall 157c forms a means for retaining the heat dissipation sole 158 in the slot 156.

On the other hand, the surfaces cooperating with each other are the surfaces of the heat sink 157 and of the heat dissipation sole 158, which are advantageously both metallic, so that there is no damage to the active component 153, more particularly of the plastic casing in which the chip of the active component 153 is encapsulated.

The invention claimed is:

1. A control module for a blower of a heating and/or ventilation and/or air conditioning device for a motor vehicle, the blower configured to generate an air flow and the control module configured to control the blower, the control module comprising:
   a heat sink;
   a heat dissipation sole; and
   at least one active electronic power component mounted on the heat dissipation sole,
   wherein the heat sink comprises a slot for receiving at least a portion of the heat dissipation sole,
   wherein the heat dissipation sole is mounted by force fitting in said slot, and
   wherein the heat dissipation sole has at least two opposite faces arranged in contact with the heat sink, when the heat dissipation sole is received in said slot.

2. The control module as claimed in claim 1, in which the heat sink comprises at least one flexible wall delimiting said slot.

3. The control module as claimed in claim 2, in which the heat sink comprises a base extending opposite said at least one flexible wall, said slot being delimited between the base and said at least one flexible wall.

4. The control module as claimed in claim 3, wherein the flexible wall is configured to move away from the base upon insertion of the heat dissipation sole into said slot, and to exert an elastic pressure on the heat dissipation sole received in said slot.

5. The control module as claimed in claim 3, wherein the heat sink has cooling fins extending from the base and configured to be arranged in the air flow generated by the blower.

6. The control module as claimed in claim 1, wherein the heat dissipation sole is configured to be inserted into said slot with a translational movement.

7. The control module as claimed in claim 1, wherein the heat sink and the heat dissipation sole are metallic.

8. The control module as claimed in claim 1, in which the heat sink comprises at least one fixing element at a level of said slot, configured to cooperate with the heat dissipation sole.

9. A heating and/or ventilation and/or air conditioning device comprising:
   a blower configured to generate an air flow;
   at least one control module for the blower comprising:
      a heat sink,
      a heat dissipation sole, and
      at least one active electronic power component mounted on the heat dissipation sole,
      wherein the heat sink comprises a slot for receiving at least a portion of the heat dissipation sole,
      wherein the heat dissipation sole is mounted by force fitting in said slot, and
      wherein the heat dissipation sole has at least two opposite faces arranged in contact with the heat sink, when the heat dissipation sole is received in said slot.

10. A control module for a blower of a heating and/or ventilation and/or air conditioning device in a motor vehicle, the control module comprising:
- a heat sink,
- a heat dissipation sole, and
- at least one active electronic power component mounted on the heat dissipation sole,
- wherein the heat sink comprises a slot for receiving at least a portion of the heat dissipation sole,
- wherein the heat dissipation sole is mounted by force fitting in said slot,
- wherein the control module is arranged in a cavity provided on a wall of an outlet of a blower housing configured to house the blower, and
- wherein the heat dissipation sole has at least two opposite faces arranged in contact with the heat sink, when the heat dissipation sole is received in said slot.

* * * * *